(12) United States Patent
de Heer et al.

(10) Patent No.: US 8,543,672 B2
(45) Date of Patent: Sep. 24, 2013

(54) METHOD FOR RECONFIGURING A RING NETWORK, A NETWORK NODE, AND A COMPUTER PROGRAM PRODUCT

(75) Inventors: Arie Johannes de Heer, Twente (NL); Ronald de Man, Enschede (NL)

(73) Assignee: Alcatel Lucent, Paris (FR)

( * ) Notice: Subject to any disclaimer, the term of this patent is extended or adjusted under 35 U.S.C. 154(b) by 3231 days.

(21) Appl. No.: 10/452,626

(22) Filed: Jun. 2, 2003

(65) Prior Publication Data

US 2005/0015470 A1    Jan. 20, 2005

(51) Int. Cl.
*G06F 15/177* (2006.01)

(52) U.S. Cl.
USPC ............ 709/221; 370/222; 370/255; 370/256

(58) Field of Classification Search
USPC .............. 709/221; 370/216–225, 256; 714/2
See application file for complete search history.

(56) References Cited

U.S. PATENT DOCUMENTS

| | | | | |
|---|---|---|---|---|
| 6,091,705 | A * | 7/2000 | Regula | 370/223 |
| 6,330,229 | B1 * | 12/2001 | Jain et al. | 370/256 |
| 6,388,995 | B1 * | 5/2002 | Gai et al. | 370/256 |
| 6,400,682 | B1 * | 6/2002 | Regula | 370/223 |
| 6,535,490 | B1 | 3/2003 | Jain | 370/256 |
| 6,535,491 | B2 * | 3/2003 | Gai et al. | 370/256 |
| 6,606,301 | B1 * | 8/2003 | Muller et al. | 370/230 |
| 6,731,596 | B1 * | 5/2004 | Chiang et al. | 370/217 |
| 6,952,396 | B1 * | 10/2005 | Cottreau et al. | 370/222 |
| 6,976,088 | B1 * | 12/2005 | Gai et al. | 709/238 |
| 7,362,709 | B1 * | 4/2008 | Hui et al. | 370/237 |
| 7,496,650 | B1 * | 2/2009 | Previdi et al. | 709/223 |
| 2002/0147800 | A1 | 10/2002 | Gai et al. | |
| 2002/0159398 | A1 * | 10/2002 | Yamada et al. | 370/256 |
| 2002/0174207 | A1 * | 11/2002 | Battou | 709/223 |
| 2004/0160895 | A1 * | 8/2004 | Holmgren et al. | 370/223 |
| 2004/0165595 | A1 * | 8/2004 | Holmgren et al. | 370/395.3 |
| 2005/0259571 | A1 * | 11/2005 | Battou | 370/217 |

OTHER PUBLICATIONS

IEEE Standard 802.1D, Draft Standard for Local Area Networks MAC (Media Access Control) Bridges: Technical and Editorial Corrections, Mar. 6, 1997, pp. 3-10.85-122 and 151-158.*
Perlman, R., An Algorithm for Distributed Computation of Spanning Tree in an Extended LAN, ACM ISSN 0146-4833, 1985, pp. 44-53.*
IEEE 802.1D Standards, ISO/IEC 15802-3:1998, LAN MAC Bridges, 1998 Edition, pp. 63-64,Section 8.3.5 Notifying Topology Changes, p. 77, 'topology change notification (TCN) BPDU', p. 92.*

* cited by examiner

*Primary Examiner* — Greg C Bengzon
(74) *Attorney, Agent, or Firm* — Wall & Tong, LLP

(57) ABSTRACT

A method of reconfiguring a ring network having a plurality of nodes connected by a plurality of links, comprising initiating reconfiguring of one of the nodes in response to a network change message received over a link connected thereto from an adjacent node, blocking said link by the one node, reconfiguring network information stored on the one node, flushing any old queued messages on said one node and, in response to completion of said flushing, sending a reconfigured message to the other node adjacent thereto, and de-blocking said link by the one node in response to receipt of a reconfigured message from the first-mentioned adjacent node.

7 Claims, 4 Drawing Sheets

METHOD FOR RECONFIGURING A RING NETWORK, A NETWORK NODE, AND A COMPUTER PROGRAM PRODUCT

FIELD OF THE INVENTION

This invention relates to methods for reconfiguring a ring network, to network nodes, and to computer program products.

BACKGROUND OF THE INVENTION

In some types of networks, such as networks compliant with the Bridged Ethernet standards, a protocol is used to configure the paths over which data with a specific destination is transmitted, i.e., to obtain information via which network nodes data (often in the form of frames or packets) has to be sent.

In Bridged Ethernet networks this protocol is called a spanning tree protocol which is used to configure a spanning tree over which data traffic is transmitted. The spanning tree provides a unique path between any two nodes in the network. As a part of the spanning tree protocol each bridge in the network uses a learning algorithm to store in an address table the directions in which received frames have to be forwarded. At times, the spanning tree may be altered by the spanning tree protocol, for example in case of failure of a link between two bridges. As part of the altering process, the address tables have to be flushed, at least partially, and rebuilt using the learning algorithm. However, the rebuilding may result in an incorrect address table. For example, if a bridge receives data transmitted both via the old spanning tree and the new spanning tree, the rebuilt address table will provide an addressing scheme based on the old, now incorrect, spanning tree which is likely to result in errors in the data traffic.

From the IEEE 802.1D standard, it is known to prevent incorrect rebuilding of the address table by blocking datalinks for rather a long time before starting the rebuilding of the address table, thereby to ensure that data frames transmitted before the altering of the spanning tree have disappeared from the network, for example because the frames reached their destination or were thrown away or discarded by nodes in the network.

However, a disadvantage of this IEEE method is that the entire network may not be used for a long time, typically around 50 seconds.

SUMMARY OF THE INVENTION

It is a goal of the invention to provide a method for preventing errors during the rebuilding of a spanning tree which does not require a lengthy shut-down of the entire network.

According to one aspect of this invention there is provided a method as claimed in claim 1.

In such a method no incorrect address learning can occur, since the link from which data is transmitted according to the old address information is blocked during reconfiguring.

According to another aspect of this invention there is provided a network node as claimed in claim 5.

According to a further aspect of this invention there is provided a computer program product as claimed in claim 7.

Specific embodiments of the invention are set forth in the dependent claims. Further details, aspects and embodiments of the invention will be described with reference to the attached drawing.

DETAILED DESCRIPTION

In this application, the following terms are understood to have at least the following meaning: a link is a channel, physical or virtual, between two nodes of a network, and may be implemented as a cable or be wireless, or as e.g. an SDH virtual channel. A link or port is blocked if, except for specific types of data, such as maintenance messages or in Ethernet networks, Bridge Protocol Data Units (BPDU), no data will be processed. A link or port is disabled when no data at all will be processed on the respective port or link. A node is any element in a network, such as for example a general purpose computer, a router, a switch or a bridge. A node which is directly connected to another node is said to be adjacent to that other node. Thus, in a ring network each node will normally have two adjacent nodes. Furthermore, the terms comprising and including are used in this application as meaning: having but not limited to.

The example of a network embodying the invention as shown in FIGS. 1 to 6 has five network nodes 10, 20, 30, 40 and 50 connected to each other in a ring topology via links 1-5. Link 5 between network node 10 and network node 50 is blocked, as indicated by the dotted lines. The shown example of a network is compliant with the Bridged Ethernet standards, also known in the art as the IEEE 802.3 and IEEE 802.1 standards. However, the invention is not limited to Bridged Ethernet networks and may also be applied in other types of networks.

Figure 1:
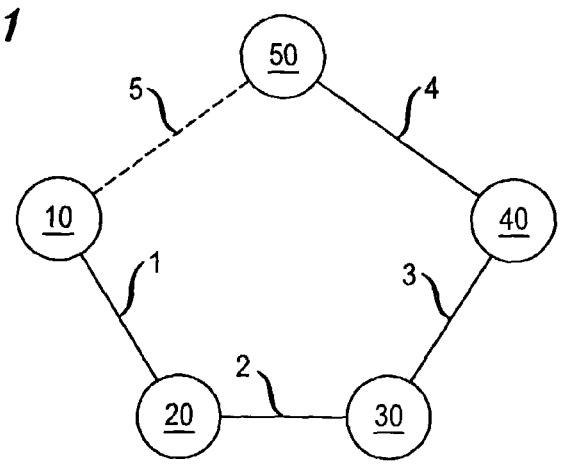
FIGS. 1-6 diagrammatically show an example of an embodiment of a communication network according to the invention in successive stages of an example of a method according to the invention.
Figure 2:
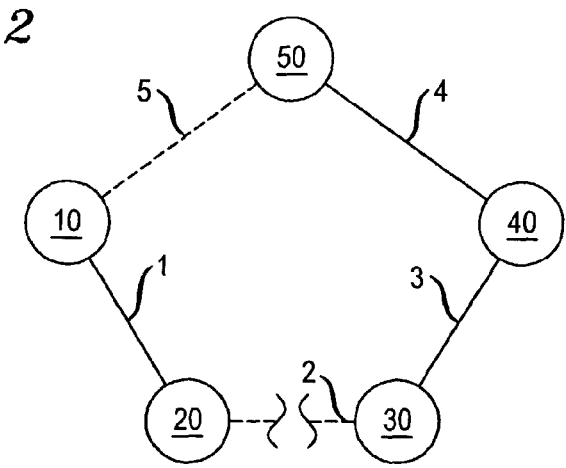
Figure 8:
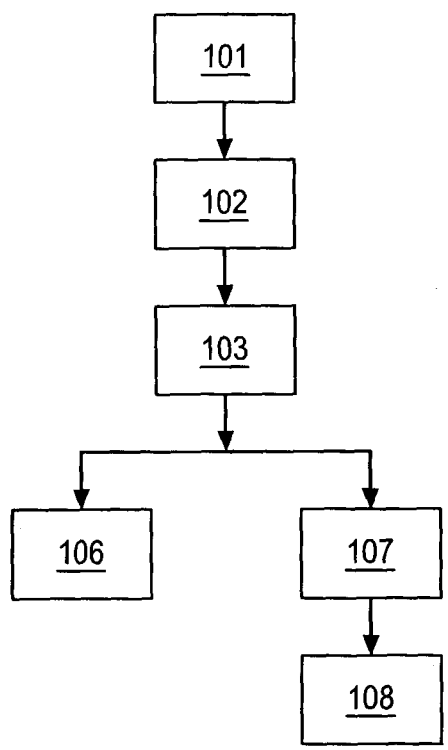
FIGS. 8, 9 and 10 show flow-charts of examples of a method according to the invention.

Network nodes 10-50 each have a memory (not shown) in which addressing information is stored as an address table providing an addressing scheme. In the network of FIG. 1, the network nodes may perform a method according to the invention, for example the method illustrated by the flow-chart of FIG. 8. In the example of FIG. 8, the method is initiated in step 101, for example by the detection of a link failure or the reception of a network change message which indicates that the addressing scheme, in the Ethernet network known as the spanning tree, should be reconfigured. For example as shown in FIG. 2, link 2 between network nodes 20 and 30 may be physically damaged, for example because of a broken cable. Hence both nodes 20 and 30 detect a link failure and initiate the method of FIG. 8 in step 101.

In step 102, the respective node blocks the link for which the failure is detected to another network node; In FIG. 2, nodes 20 and 30 block the link 2 by closing the ports (not shown) connected to link 2 on the respective node, as is indicated by the dotted line between nodes 20 and 30.

Figure 3:
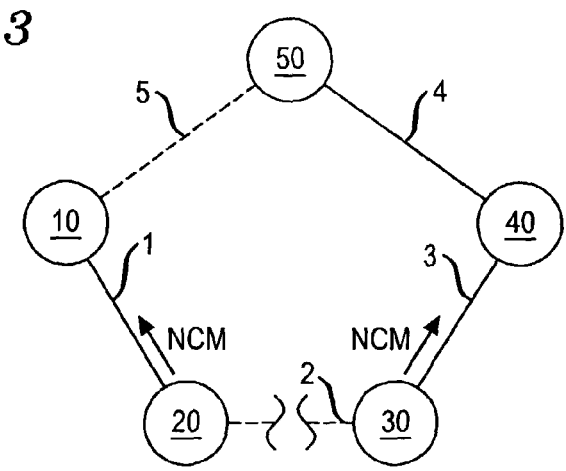

In step 103 the node sends a network change message (NCM) to a node directly connected to the node after or during the closing of the link. Thus in the example, node 20 sends a NCM to adjacent node 10 via link 1 after closing link 2, and node 30 sends a NCM to adjacent node 40 via link 3 (FIG. 3).

Steps 102 and 103 may be performed in the order shown and described, or they may be performed in reverse order, or they may be performed at the same time as each other.

After steps 102 and 103, the flowchart of FIG. 8 divides into two branches, one comprising step 106, and the other comprising steps 107 and 108. The steps in one branch may be performed after, or before, or preferably, for the sake of speed, at the same time as the steps of the other branch.

In step 106, nodes 20 and 30 reconfigure the addressing information, in the example of FIG. 1 by at least partially erasing or flushing the, Bridged Ethernet compliant, address table.

Figure 5:
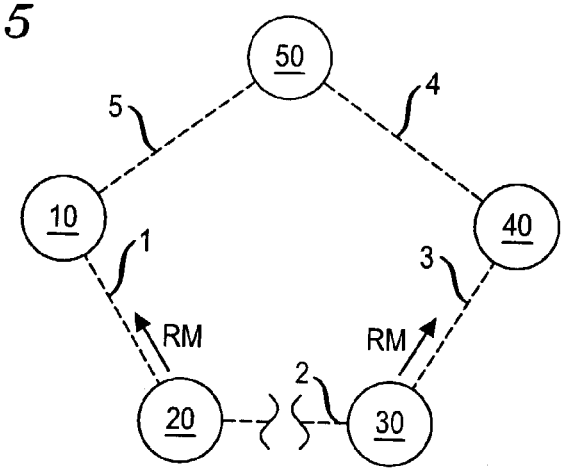

In step 107 any old queued messages are also flushed by simply deleting them or waiting for their regular transmission to finish. After flushing the old queued messages, as is illustrated in FIG. 5, nodes 20 and 30 send, in step 108, a reconfigured message (RM) to nodes 10 and 40, respectively, via links 1 and 3, respectively. These RM messages indicate to nodes 10 and 40 that nodes 20 and 30, respectively, have finished flushing old queued messages.

Figure 9:
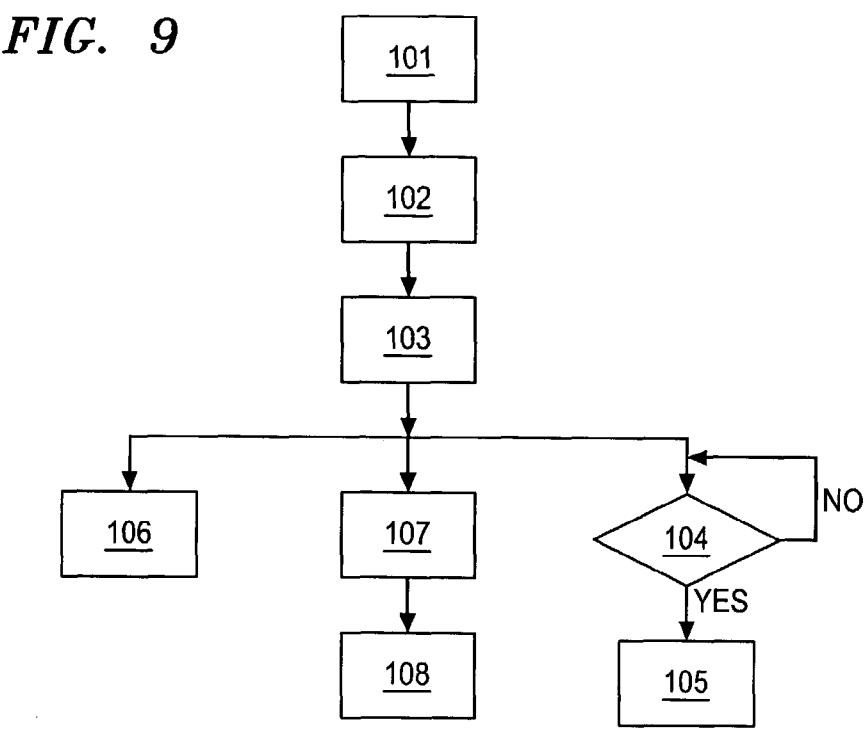

The nodes which are not directly connected to the failed link and are not connected to a blocked link are able to perform a method as illustrated in FIG. 9 in which, in step 101, the method is initiated with the reception of a NCM from another node. Thus, in the example of FIGS. 1-6, node 40 receives a NCM from node 30, as shown in FIG. 3.

Figure 4:
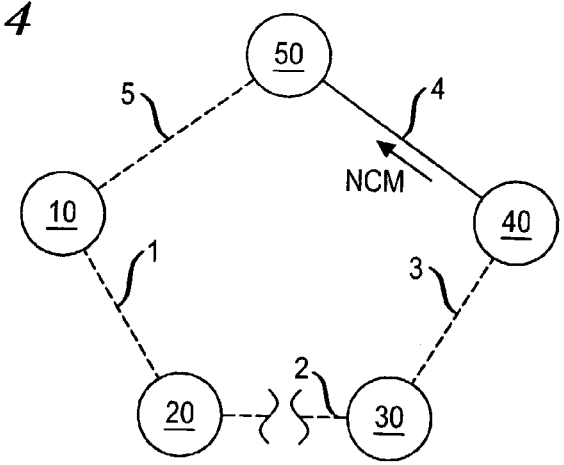
Figure 6:
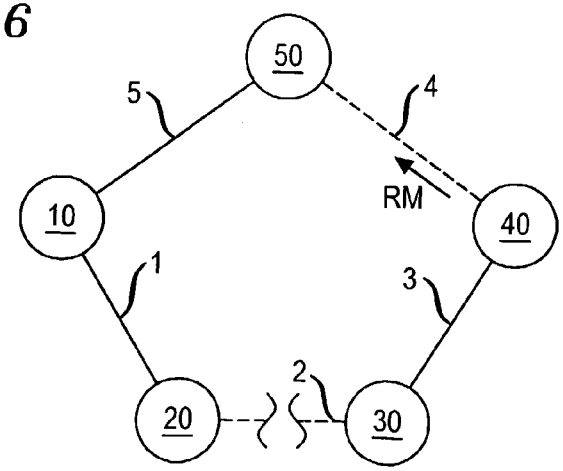

In step 102, in reaction to the NCM, the respective node blocks the link over which the NCM was transmitted, as indicated in FIG. 4 by the dotted lines. Thus, in the network of FIGS. 1-6, in step 102 node 40 blocks the port to link 3. In step 103, which, as in FIG. 8, may be performed before, after, or at the same time as step 102, node 40 sends a NCM to adjacent node 50. After steps 102 and 103, the flowchart of FIG. 9 divides into three branches, the first comprising steps 104 and 105, the second comprising step 106, and the third comprising steps 107 and 108. The steps in one branch may be performed after, or before, or preferably, for the sake of speed, at the same time as the steps of the other branches. In step 106 node 40 reconfigures its addressing information by at least partially flushing its address table. In step 107, as in step 107 of FIG. 8, the node also flushes any old queued messages, after which, in step 108, node 40 transmits a RM to a node directly connected to the respective node for links which are open. Thus, in the example, node 40 transmits a RM to node 50 as is shown in FIG. 6. In step 104 node 40 checks if it has received a RM, and, if so, in step 105 node 40 de-blocks the respective link over which the RM was received (in this example the RM transmitted in step 108 of FIG. 8). Thus in the shown example, node 40 de-blocks the port to the blocked link 3.

Figure 10:
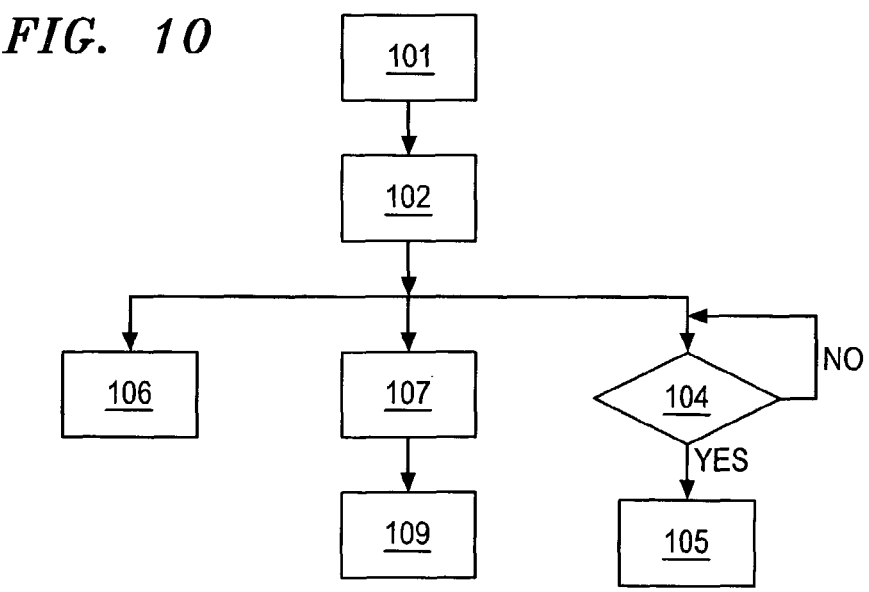

The nodes which are directly connected to a blocked link are able to perform a method as illustrated in FIG. 10 in which, in step 101, the method is initiated with the reception of a NCM from another node. Thus, in the example of FIGS. 1-6, node 10 receives an NCM from adjacent node 20, as shown in FIG. 3, and node 50 receives an NCM from adjacent node 40, as shown in FIG. 4.

In step 102, in reaction to the NCM, the respective node blocks the link over which the NCM was received, as indicated in FIG. 4 and FIG. 5 by the dotted lines. Thus, in the network of FIGS. 1-6, in step 102 node 10 blocks the port to link 1 and node 50 blocks the port to link 4.

After step 102, the flowchart of FIG. 10 divides into three branches, the first branch comprising step 106, the second branch comprising steps 107 and 109, and the third branch comprising step 104 and 105. The steps in one branch may be performed after, or before, or preferably, for the sake of speed, at the same time as the steps of the other branches.

In step 106, nodes 10 and 50 reconfigure the addressing information, in the example of FIG. 1 by at least partially erasing or flushing the, Bridged Ethernet compliant, address table.

In step 107 any old queued messages are also flushed by simply deleting them or waiting for their regular transmission to finish. After the old queued messages have been flushed, in step 109 the respective node de-blocks the link over which no NCM was transmitted. Thus, in the example of FIGS. 1-6, node 10 and node 50 de-block link 5, as is shown in FIG. 6.

In step 104 the respective nodes check if they have received an RM, and, if so, in step 105 the nodes de-block the respective links over which the RM was received. In the example of FIGS. 1-6, node 10 de-blocks link 1 after receiving the RM from node 20 as transmitted in step 108 of FIG. 8, and node 50 de-blocks link 4 after receiving the RM as transmitted in step 108 of FIG. 9.

Figure 7:
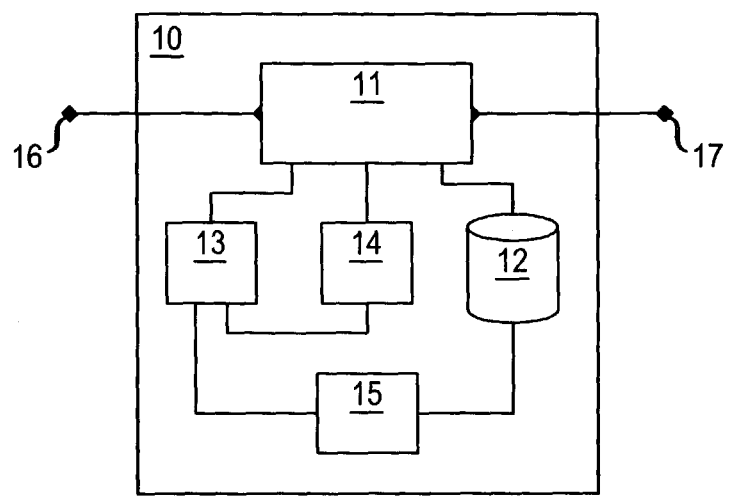
FIG. 7 shows a block diagram of a network node embodying the invention.

FIG. 7 shows a block diagram of an example of a network node 10 embodying the invention. The node 10 may, for example, be a general purpose computer, a router, a bridge or otherwise. The node has a data handler device 11 which is arranged to handle received data, for example by transmitting the data further, discarding the data or displaying the data. The data handler device 11 is communicatively connected to an input port 16 and an output port 17. Connected to data handler device 11 is a memory device 12 in which information about the data is stored, for example as an address table or routing information. Also connected to data handler device 11 are a change detector 13 and an inhibitor device 14. The change detector 13 is also connected to an eraser device 15 which is connected to memory device 12. The change detector detects the necessity for changing the spanning tree, for example because detector 13 monitors the integrity of the links to which the input port 16 and the output port 17 are connected and/or detects the reception of NCMs and/or RMs. If detector 13 finds that the spanning tree has to be changed, detector 13 will send a signal to inhibitor device 14 and eraser device 15 and sends a NCM to output port 17. Inhibitor device 14 then blocks one or more of the links connected to node 10, while eraser device 15 will at least partially erase the addressing information in memory 12. After having erased the addressing information, the eraser device will send a signal to detector 13. In reaction, detector 13 will send a RM to output port 17 via data handler 11 and also will send a signal to inhibitor device 14 to stop blocking the link.

A method, network node, or computer program product according to the invention may be compliant with any networking protocol, for example, the Bridged Ethernet standards, and if the invention is applied in a Bridged Ethernet network, the NCM and the RM may be implemented as bridge protocol data units (BPDU), which are already provided for in the Bridged Ethernet protocols.

After reading the description of examples according to the invention, various modifications will be obvious to the skilled person. In particular, it should be apparent to a skilled person that the invention is not limited to application in a physical device but can likewise be applied in a computer program product containing software code instructions which when loaded in a programmable device enable the programmable device to perform at least a part of the invention. Furthermore, it should be apparent that the described devices in a system according to the invention may be arranged in a different manner, for example by integrating the devices in a single device or implementing devices as physically different devices which from a logical point of view may be seen as a single device.

The invention claimed is:

1. A method for reconfiguring a ring network comprising a plurality of nodes connected by a plurality of links to form said network, the method comprising, at one of said nodes:
   initiating reconfiguring of said one node in response to receipt of a network change message, NCM, received from an adjacent node;
   blocking the link over which the NCM was received;
   sending an NCM to the other adjacent node;
   reconfiguring address information in said one node by at least partially flushing address information in said one node;
   flushing any old queued messages from said one node;
   transmitting a reconfigured message, RM, to said other adjacent node in response to completion of said flushing any old queued messages; and
   de-blocking said link in response to a RM received from said adjacent node.

2. A method as claimed in claim 1 comprising, at a node connected to a failed link:
   initiating reconfiguring at said node in response to detection of failure of said link;
   sending a NCM to an adjacent node at the other end of the non-failed link connected to said node;
   blocking the failed link;
   reconfiguring address information in said node by at least partially flushing address information in said node;
   flushing any old queued messages from said node; and
   transmitting a RM to said adjacent node at the other end of said non-failed link in response to completion of said flushing any old queued messages from said node.

3. A method as claimed in claim 1 comprising, at a further node connected to a blocked link:
   initiating reconfiguring of said further node in response to receipt of a NCM from an adjacent node;
   blocking the link over which the NCM was received;
   reconfiguring address information in said further node by at least partially flushing address information in said further node;
   flushing any old queued messages from said further node;
   de-blocking said blocked link in response to completion of said flushing of any old queued messages from said further node; and
   de-blocking the link, over which the NCM was received, in response to a RM received from said adjacent node.

4. A method as claimed in claim 1, wherein the ring network is compliant with an Ethernet standard.

5. A network node comprising:
   at least one input port;
   at least one output port;
   a data handler device for transmitting data from at least one of the input ports to at least one of the output ports;
   a change detector for detecting a necessity for network changes;
   a message generator device for generating at least one of a network change message and a reconfigured message and for transmitting said messages;
   a memory for storing data representing network address information;
   an erasing device for erasing at least a part of said memory, which erasing device is communicatively connected to at least one of the input ports and at least one of the output ports; and
   an inhibitor device for blocking at least one of the input ports or the output ports;
   wherein the message generator device, the erasing device and the inhibitor device are controlled by the change detector.

6. A data communication ring network comprising a plurality of network nodes each as claimed in claim 5.

7. A computer program product, disposed on a computer-readable storage medium, the computer program product including instructions for causing a processor to perform steps of a method according to claim 1.

* * * * *